United States Patent [19]

Teshigawara

[11] Patent Number: 4,906,884
[45] Date of Patent: Mar. 6, 1990

[54] FLAT MOTOR

[75] Inventor: Toshiyuki Teshigawara, Maebashi, Japan

[73] Assignee: Sanden Corporation, Gunma, Japan

[21] Appl. No.: 251,791

[22] Filed: Oct. 3, 1988

[30] Foreign Application Priority Data

Oct. 9, 1987 [JP] Japan .............................. 62-154829[U]
Oct. 14, 1987 [JP] Japan .............................. 62-157300[U]
Oct. 16, 1987 [JP] Japan ................................. 62-261028

[51] Int. Cl.$^4$ ............................................ H02K 23/54
[52] U.S. Cl. ..................................... 310/268; 310/239; 310/91
[58] Field of Search ..................... 310/42, 89, 91, 154, 310/233, 238, 239, 268

[56] References Cited

U.S. PATENT DOCUMENTS

| 3,219,860 | 11/1965 | Redick et al. | 310/239 |
| 3,760,209 | 9/1973 | Hult | 310/91 |
| 3,838,300 | 9/1974 | O'Connor | 310/239 |
| 4,571,515 | 2/1986 | Baader | 310/42 |
| 4,677,335 | 6/1987 | Ueda et al. | 310/268 |
| 4,763,037 | 8/1988 | Hashimoto et al. | 310/268 |

FOREIGN PATENT DOCUMENTS

1478234 4/1967 France .
1534053 7/1968 France .
53-39409 4/1978 Japan .
54-7109 1/1979 Japan .

Primary Examiner—Patrick R. Salce
Assistant Examiner—Kristine Peckman
Attorney, Agent, or Firm—Banner, Birch, McKie & Beckett

[57] ABSTRACT

A flat motor is disclosed comprising a motor housing having a first engaging mechanism, a magnet fixed to the motor housing, a holder plate attached to the motor housing and provided with a pair of brush holders. The holder plate has a second engaging mechanism engaging the first engaging mechanism. A third engaging mechanism engages an inside surface of the magnet. The holder plate can be positioned coaxially with the motor housing by the engagement of the first engaging mechanism with the second engaging mechanism, the magnet can be positioned coaxially with the holder plate by the engagement of the third engaging mechanism with the magnet. The motor housing, the holder plate and the magnet can all be positioned coaxially with one another without use of a particular jig, thereby improving the assembly of the flat motor and increasing the productivity of the motor.

16 Claims, 8 Drawing Sheets

FLAT MOTOR

BACKGROUND OF THE INVENTION

1. Field of the Invention

The present invention relates to a D.C. flat motor, and specifically relates to improvement of the inside structure of the flat motor in order to make the assembly of the motor easy and increase the productivity of the motor.

2. Description of the Prior Art

Figure 12:
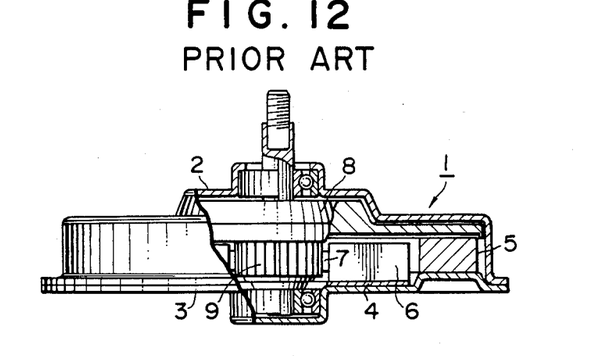
FIG. 12 is a partially cut away side view of the conventional flat motor.

The conventional D.C. flat motor is constructed, for example, as shown in FIG. 12. Flat motor 1 has upper and lower motor housings 2 and 3, a resin holder plate 4 attached onto the lower housing 3 coaxially with the lower housing, and a ring-like shaped magnet 5. A pair of brush holders 6 are provided on holder plate 4 and a brush 7 is inserted into each of the brush holders. Brush 7 is urged by an urging device such as a spring (not shown) so as to come into contact with commutator 9 of armature 8.

In such a type of flat motor, motor housing 3, holder plate 4 and magnet 5 are required to be arranged coaxially with one another. However, means for disposing these members coaxially is not provided in the conventional flat motor itself. Therefore, in assembly of the conventional flat motor, a jig is used for disposing these members coaxially, particularly for disposing magnet 5 coaxially with motor housing 3, the centers of both members are met by the jig when the magnet is bonded to the motor housing by an adhesive, and then, the magnet is fixed to the motor housing by the jig until the adhesive is cured.

In such a method for assembly of a flat motor, however, since the number of jigs must correspond to the production number of the motors which are produced during the curing time of the adhesive, a large number of jigs are required and the cost of the jigs is relatively high. Moreover, since jigs must be used for assembly, the work to be done during assembly is troublesome.

Figure 13:
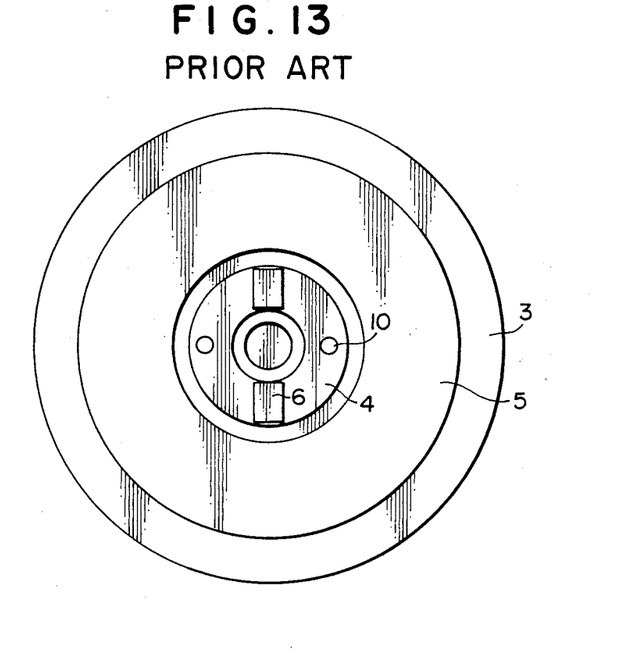
FIG. 13 is a plan view of the part of the flat motor shown in FIG. 12.
Figure 14:
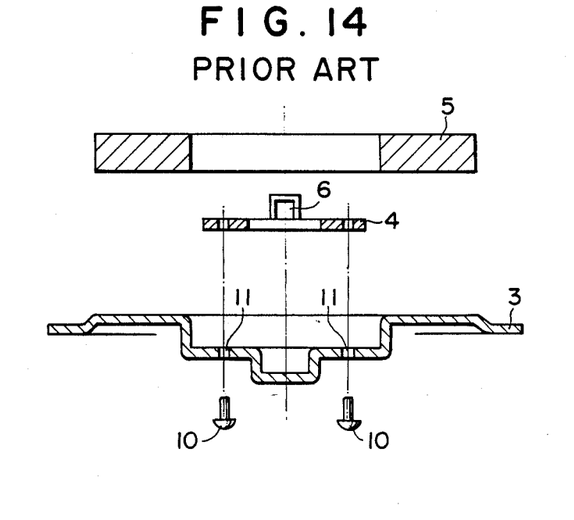
FIG. 14 is an exploded sectional view of the part shown in FIG. 13.

In the assembly of the above flat motor 1, there is one method wherein resin holder plate 4 is fixed directly to motor housing 3 by an adhesive and another method wherein the holder plate is fixed to the motor housing via screws or rivets 10. FIGS. 13 and 14 show the latter case.

In the case where holder plate 4 is bonded to motor housing 3 by only an adhesive, however, since the bonding strength between the resin of the holder plate and the metal of the motor housing is only about ¼ of the bonding strength between metals, the bonding strength is often insufficient, thereby decreasing the reliability and durability of the motor.

In the case where the holder plate 4 is fixed to the motor housing 3 via screws or rivets 10, through holes 11 must be formed in the motor housing for inserting the screws or rivets, as shown in FIGS. 13 and 14. In such a structure, there is a fear that water may seep into the motor through the holes 11 and cause the inside of the motor to rust. Moreover, since the process of inserting and fastening the screws or rivets is necessary, the work during assembly becomes troublesome and the cost for the production of the motor becomes large.

After assembling holder plate 4 and magnet 5 coaxially with motor housing 3, armature 8 including commutator 9 is inserted. During this insertion, since each brush 7 is urged inward by the urging device, the motion of the brush is stopped by a tweezers-like shaped jig and the brush is held in brush holder 6 against the urging force of the urging device. Then, commutator 9 is inserted between a pair of brushes 7 down to a position where the magnetic gap between armature 8 and magnet 5 is set to a predetermined small gap.

In order to insert commutator 9 down to a position where the magnetic gap reaches a predetermined small gap, however, the jig for the insertion must be small and flexible. The conventional tweezers-like shaped jig cannot sufficiently satisfy such a requirement.

SUMMARY OF THE INVENTION

An object of the present invention is to provide a flat motor of which the motor housing, the holder plate and the magnet can be coaxially positioned without use of a jig, thereby improving the working steps during assembly of the motor and increasing the productivity of the motor.

Another object of the present invention is to provide a structure of a flat motor wherein a holder plate can be bonded to a motor housing by an adhesive with a sufficient bonding strength without use of screws or rivets, thereby increasing the reliability and durability of the motor.

A further object of the present invention is to provide a flat motor wherein it is easy to assemble a commutator between a pair of brushes after a holder plate and a magnet are fixed to a motor housing, thereby making the assembly of the motor easy as a whole.

To accomplish the above objects, a flat motor according to the present invention comprises:

a motor housing having a first engaging mechanism;

a ring-like shaped magnet fixed to the motor housing;

a holder plate attached to the motor housing and provided with a pair of brush holders each holding a brush therein, the holder plate having a second engaging mechanism which positions the holder plate coaxially with the motor housing by engagement of the second engaging mechanism with the first engaging mechanism, and a third engaging mechanism which positions the magnet coaxially with the holder plate by engagement of the third engaging mechanism with an inside surface of the magnet; and an armature including a commutator which is inserted between a pair of brushes held in the pair of brush holders.

In the flat motor, desirably, a recessed portion is formed on at least one of the surface of the motor housing and the surface of the magnet which face each other, and a brim portion formed on the periphery of the holder plate is inserted into the recessed portion. Each of the pair of brushes, for instance, is inserted into each of the pair of brush holders from a entrance which is located inside of each of the brush holders in a radial direction of the motor, and the inserted brush is urged inward in the radial direction by an urging device so as to come into contact with the commutator. In the motor having such a structure, a hook-shaped piece is provided on the holder plate at each position near each entrance to the pair of brush holders.

In the flat motor according to the present invention, the holder plate is positioned coaxially with the motor housing by the engagement between the first engaging mechanism and the second engaging mechanism. When the magnet is set on the motor housing on which the holder plate has been attached coaxially with the motor housing, the third engaging mechanism engages the inside surface of the magnet. At that time, the third engaging mechanism regulates the position of the magnet coaxially with the holder plate. As a result, the motor housing, the holder plate and the magnet are positioned coaxially with one another.

In this structure, since the magnet may merely be engaged with the third engaging mechanism when the magnet is being coaxially bonded to the motor housing, it is only necessary to wait for the cure of the adhesive to complete the bonding after the magnet is positioned coaxially with the motor housing. Accordingly, a jig for keeping the relationship between the positions of the magnet and the motor housing is not required, the cost of the jig can be saved and the work of the assembly of the motor can be made easier. As a result, the productivity of the flat motor can be increased.

In an embodiment wherein the recessed portion and the brim portion are provided, since the brim portion can be strongly supported between the motor housing and the magnet, the holder plate can be strongly fixed via the support even if the holder plate is constructed from a resin. Therefore, the method using an adhesive can be adopted for bonding the holder plate to the motor housing with no problem, and the reliability and durability of the motor can be greatly increased. Since screws or rivets are not used in this bonding method, the problem of the seepage of water through holes does not occur and also the assembly of the motor can be made easier.

Furthermore, in an embodiment wherein a pair of hook-shaped pieces are provided near a pair of bush holders, a pair of wires having an elasticity engage the hook-shaped pieces, and each of the extending portions of the wires is positioned at a position of the entrance of each brush holder. The wire can stop the motion of the brush urged by the urging device and the brush can be held in the brush holder. Since the motion of the pair of brushes inward in the radial direction can be checked by the wires, the commutator can be easily inserted between the brushes down to a desirable position. As the wire is flexible and is shaped in a configuration having a small diameter, the wire does not occupy a large space and does not constitute a obstruction to the insertion of the commutator. As the result of use of the wires, the assembly work of the motor can be improved greatly.

BRIEF DESCRIPTION OF THE DRAWINGS

Some preferred exemplary embodiments of the invention will now be described with reference to the accompanying drawings which are given by way of example only, and thus are not intended to limit the present invention, and in which.

DETAILED DESCRIPTION OF THE PREFERRED EMBODIMENTS

The preferred embodiments of the present invention will be described hereafter with reference to the attached drawings.

FIGS. 1-6 illustrate a flat motor according to a first embodiment of the present invention. A flat motor has a disk-like shaped upper motor housing 21 opening downward, a lower motor housing 22 closing the opening of the upper motor housing, and a motor shaft 23 extending through the upper motor housing and in the lower motor housing.

Figure 1:
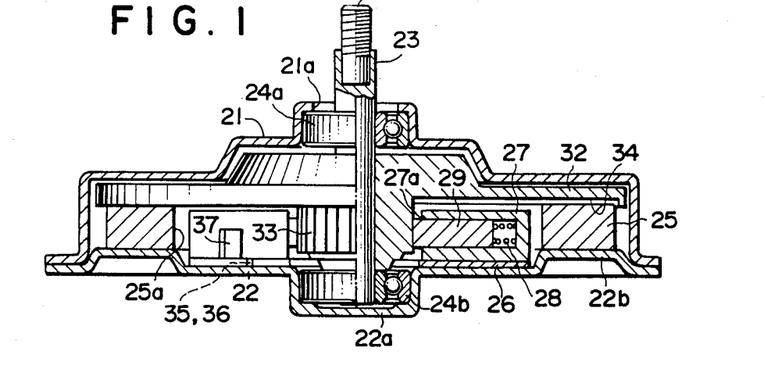
FIG. 1 is a sectional view of a flat motor according to a first embodiment of the present invention.

Upper motor housing 21 has a stepped shape in section and a through hole 21a for motor shaft 23. A bearing 24a is mounted on an upper portion of motor shaft 23, and the outer ring of bearing 24a is fixed to the inside surface of upper motor housing 21. Lower motor housing 22 has a depressed portion 22a in the central portion of the motor housing, and a protrusive portion 22b extending in the circumferential direction of the motor housing on the outer portion in the radial direction of the motor housing. A bearing 24b is mounted on a lower portion of motor shaft 23, and the outer ring of bearing 24b is fixed to the inside surface of depressed portion 22a. A ring-like shaped magnet 25 is fixed on the top surface of protrusive portion 22b. Magnet 25 is bonded to motor housing 22 by an adhesive. A resin holder plate 26 is attached on motor housing 22 between depressed portion 22a and protrusive portion 22b. In this embodiment, holder plate 26 is bonded to motor housing 22 by an adhesive.

Figure 2:
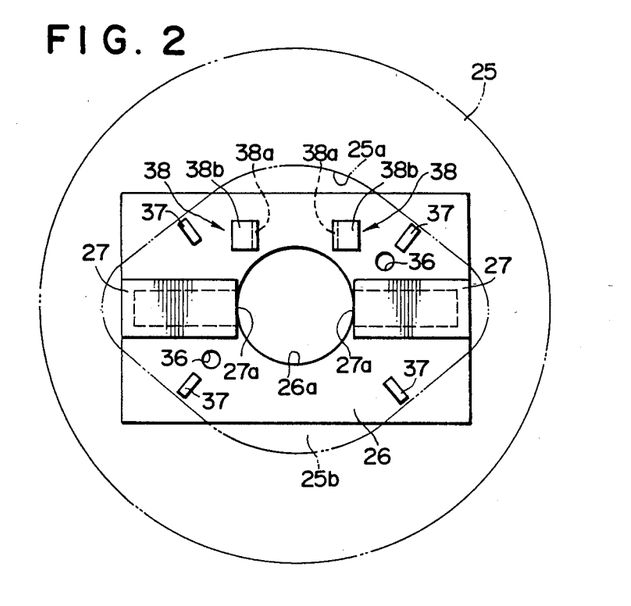
FIG. 2 is a plan view of a holder plate of the flat motor shown in FIG. 1.
Figure 4:
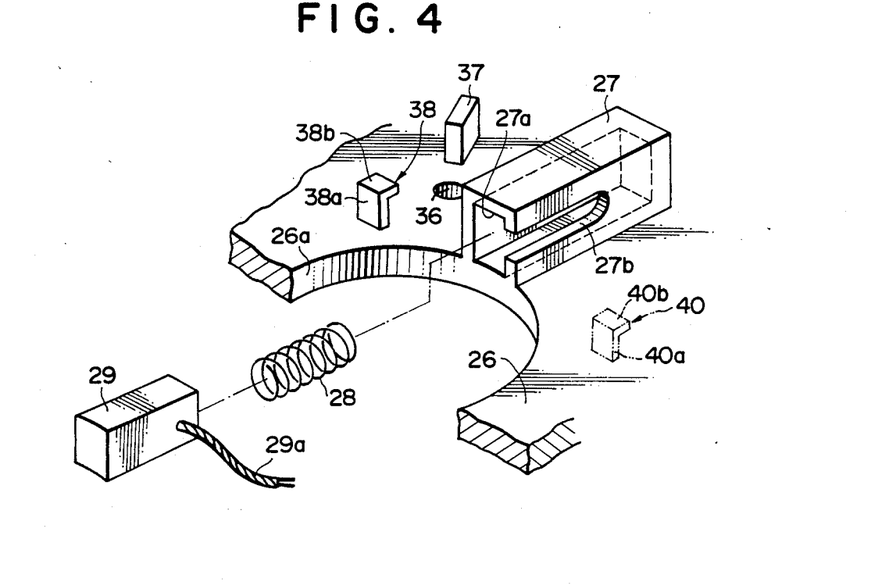
FIG. 4 is an enlarged exploded perspective view of a portion of a brush and a brush holder of the flat motor shown in FIG. 1.

Holder plate 26 is formed as a rectangle and has a hole 26a in the central portion thereof, as shown in FIG. 2. A pair of brush holders 27 are provided on the holder plate 26 and arranged in the longitudinal direction of the holder plate so that entrances 27a for brushes 29 face each other with a predetermined distance. A slot 27b is defined on a side wall of each brush holder 27. A spring 28 for urging the brush 29 and the brush are inserted into the brush holder in order, and a pig tale 29a of the brush is led out through the slot, as shown in FIG. 4. Brush holder 27 is constructed from a resin and formed integrally with holder plate 26 in this embodiment. The brush holder may be constructed from a metal and it may be fixed on holder plate 26.

A connecting screw 31 is attached at the top portion of motor shaft 23. A disk-shaped armature 32 wound with coils therein and a commutator 33 are fixed on motor shaft 23 at positions between bearings 24a and 24b. A magnetic gap 34 with a predetermined value is set between the armature 32 and magnet 25.

Figure 3:
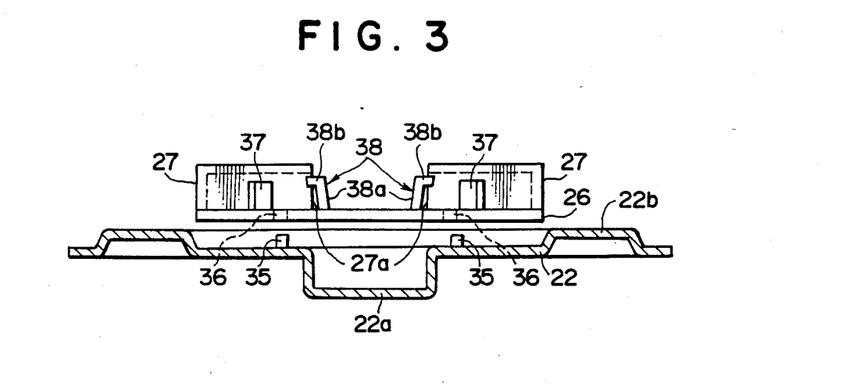
FIG. 3 is a partially cut away side view of the holder plate and a motor housing of the flat motor shown in FIG. 1.

Columnar projections 35 are provided as a first engaging mechanism on motor housing 22, and through holes 36 function as a second engaging mechanism on holder plate 26. Columnar projections 35 are inserted into corresponding through holes 36, respectively. The positions of columnar projections 35 and through holes 36 are set so that holder plate 26 can be positioned coaxially with motor housing 22 by the engagement of the respective columnar projections with the corresponding through holes.

Four rectangular projections 37 are provided on holder plate 26 as a third engaging mechanism. Although projections 37 are formed integrally with holder plate 26 in this embodiment, they may be made as pieces different from the holder plate and fixed to the holder plate. The positions of the respective projections 37 are set so that magnet 25 can be positioned coaxially with holder plate 26 by the engagement of the outer surfaces of projections 37 in the radial direction of the motor with the inside surface 25a of magnet 25. A center hole 25b, defined by the inside surface 25a of magnet 25, is formed as a lozenge in this embodiment. The positions of projections 37 are desirably set to positions along a shape of an allowable minimum size of the center hole 25b of magnet 25. In such a arrangement of projections 37, the projections can engage the inside surface 25a of magnet 25 even though the center hole 25b has been defined as an allowable minimum size in a manufacturing process.

A hook-shaped piece 38 is provided on holder plate 26 at a position near each entrance 27a of respective brush holders 27 so as to protrude from the upper surface of the holder plate. Each hook-shaped piece 38 is constructed of a support portion 38a extending upward from holder plate 26 and a hook portion 38b connected to the top portion of the support portion and turned in a horizontal direction therefrom. In this embodiment, hook-shaped pieces 38 are also formed integrally with holder plate 26. The support portions 38a, are located at positions inside of the entrances 27a of brush holders 27 in the longitudinal direction of holder plate 26. The hook portions 38b turn to outer sides of holder plate 26 in the longitudinal direction of the holder plate. The position of hook portions 38b in the height direction is set to a position lower than that of the upper surface of magnet 25. Although each hook-shaped piece 38 is provided on one side of each brush holder 27 in this embodiment, another hook-shaped piece 40 having a support portion 40a and a hook portion 40b may be provided on another side of each brush holder 27 as shown with two-dot line in FIG. 4.

In the flat motor as described above, holder plate 26 is first attached onto motor housing 22, thereafter, magnet 25 is bonded to the motor housing, and then, armature 32 is inserted together with commutator 33.

In the assembly of holder plate 26 to motor housing 22, since two columnar projections 35 projecting from the motor housing are inserted into corresponding through holes 36 in the holder plate, respectively, the holder plate can be easily positioned precisely coaxially with the motor housing without use of a particular jig. In the assembly of magnet 25 onto the protrusive portion 22b of motor housing 22, since four projections 37 provided on holder plate 26 engage the inside surface 25a of the magnet, the magnet can be naturally positioned coaxially with the holder plate only by being put onto motor housing 22. At that time, since holder plate 26 has been already positioned coaxially with motor housing 22, the motor housing, the holder plate and magnet 25 are all ultimately positioned coaxially with one another. Therefore, magnet 25 may be left as it is set onto motor housing 22 until the curing of an adhesive for bonding the magnet and the motor housing is completed, a special jig for maintaining the relationship between the positions of the magnet and the motor housing is not required. Thus, the assembly of holder plate 26 and magnet 25 on motor housing 22 can be made easy, the productivity of the motor can be increased and the cost for the assembly can be reduced since a special jig is not used.

Figure 5:
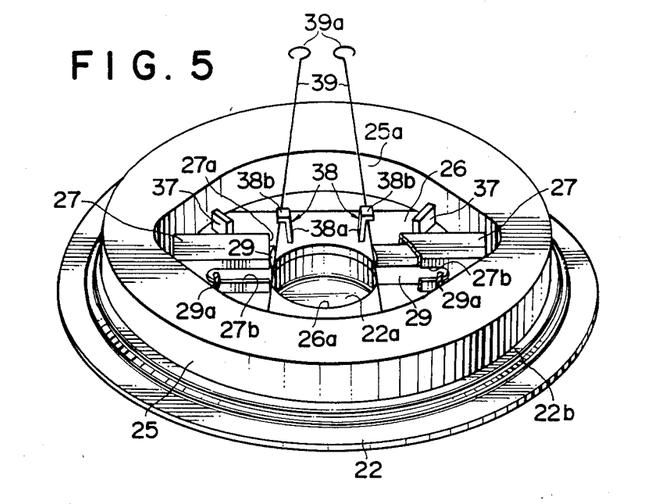
FIG. 5 is a perspective view of a part of the flat motor shown in FIG. 1, showing the assembly of the flat motor.
Figure 6:
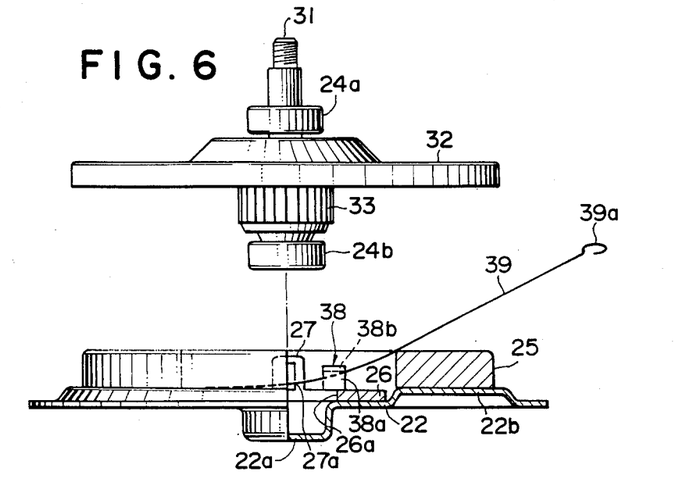
FIG. 6 is an exploded side view of the flat motor shown in FIG. 1, showing the assembly of an armature of the flat motor.

After holder plate 26 and magnet 25 are bonded to motor housing 22, spring 28 and brush 29 are inserted, in order, into each brush holder 27, as shown in FIG. 4. Then, as shown in FIGS. 5 and 6, a pair of wires 39 having an elasticity and having rings 39a on their end portions for handling are inserted over the upper surface position of magnet 25 toward the upper surface position of holder plate 26, and through the lower surface positions of hook portions 38b of hook-shaped pieces 38, while the motion of the brushes 29 urged by springs 28 is checked by a hand from the insides of the brushes in the radial direction of the motor. The wires 39 are extended so as to cross entrances 27a of brush holders 27 and the end portions of the wires opposite to rings 39a come into contact with the upper surface of holder plate 26.

In such a state, since hook portions 38b are positioned lower than the height of magnet 25, wires 39 are pressed onto the upper surface of the magnet, the lower surface of the hook portions and the upper surface of holder plate 26, and curved downward. This can frictionally fix wires 39 to a sufficient degree, so that brushes 29 are prevented from getting out of brush holders 27 by the wires and are held in the brush holders.

Next, motor shaft 23, mounted with bearings 24a and 24b, armature 32 and commutator 33, is assembled. When the lower portion of commutator 33 is inserted down to a position between a pair of brush holders 27, wires 39 are removed by pulling rings 39a of the wires. The motion of brushes 29 urged by springs 28 is allowed by the removal of wires 39, and the brushes are pressed onto commutator 33.

Then, the motor shaft 23 is inserted downward to a position that defines a predetermined magnetic gap 34 between magnet 25 and armature 32. Thereafter, upper motor housing 21 is assembled and the upper motor housing is fixed to lower motor housing 22. Thus, the assembly of the flat motor is completed.

In the above assembly, since wires 39 prevent brushes 39 from getting out of brush holders 27, the insertion of commutator 33 can be made easily and the assembly of armature 32 and motor shaft 23 becomes very easy. Moreover, since ring 39a is formed on an end portion of each wire 39, the wire can be inserted and removed very easily.

Figure 7:
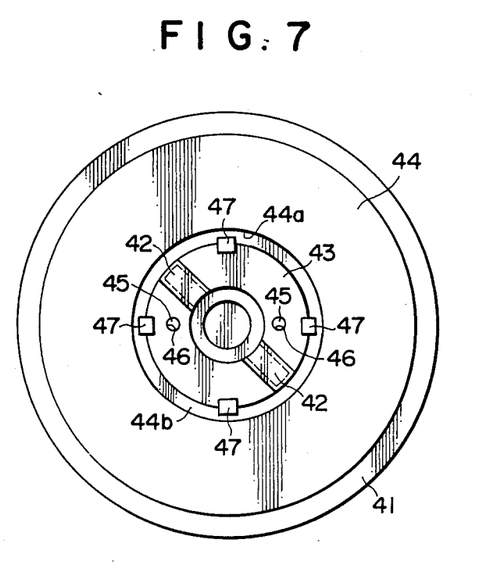
FIG. 7 is a plan view of a part of a flat motor according to a second embodiment of the present invention.
Figure 8:
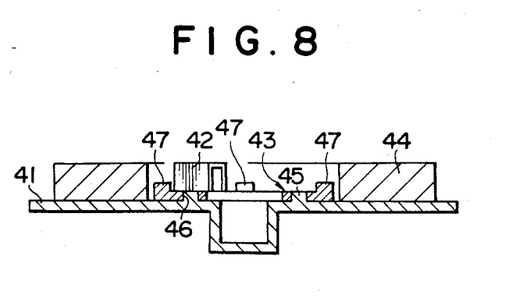
FIG. 8 is a sectional view of the part of the flat motor shown in FIG. 7.

FIGS. 7 and 8 illustrate a part of a flat motor according to a second embodiment of the present invention. In FIGS. 7 and 8, a motor housing 41, holder plate 43 having a pair of brush holders 42 and magnet 44 are shown. In this embodiment, holder plate 43 is shaped in a circle and the center hole 44b of magnet 44 is also shaped in a circle. Columnar projections 45 are provided on motor housing 41 as a first engaging mechanism and through holes 46 engaging the columnar projections are formed through holder plate 43 as a second engaging mechanism, similarly as provided in the aforementioned first embodiment. In holder plate 43, four block-shaped projections 47 engaging the inside surface 44a of magnet 44 are provided as a third engaging mechanism. The projections are formed integrally with the holder plate in this embodiment. Projections 47 are arranged in the circumferential direction of holder plate 43 with the same pitches.

In this embodiment, holder plate 43 is positioned coaxially with motor housing 41 by the engagement of columnar projections 45 with through holes 46, magnet 44 is positioned coaxially with the holder plate by the engagement of projections 47 with the inside surface 44a of the magnet, and the motor housing, the holder plate and the magnet are all positioned coaxially with one another. Since the center hole 44b of magnet 44 is shaped in a circle and projections 47 are arranged on the periphery of circular holder plate 43 in the circumferential direction with the same pitches, as compared with the first embodiment, there is no directional restriction in the circumferential direction upon the assembly of the magnet, thereby making the assembly easier.

Figure 9:
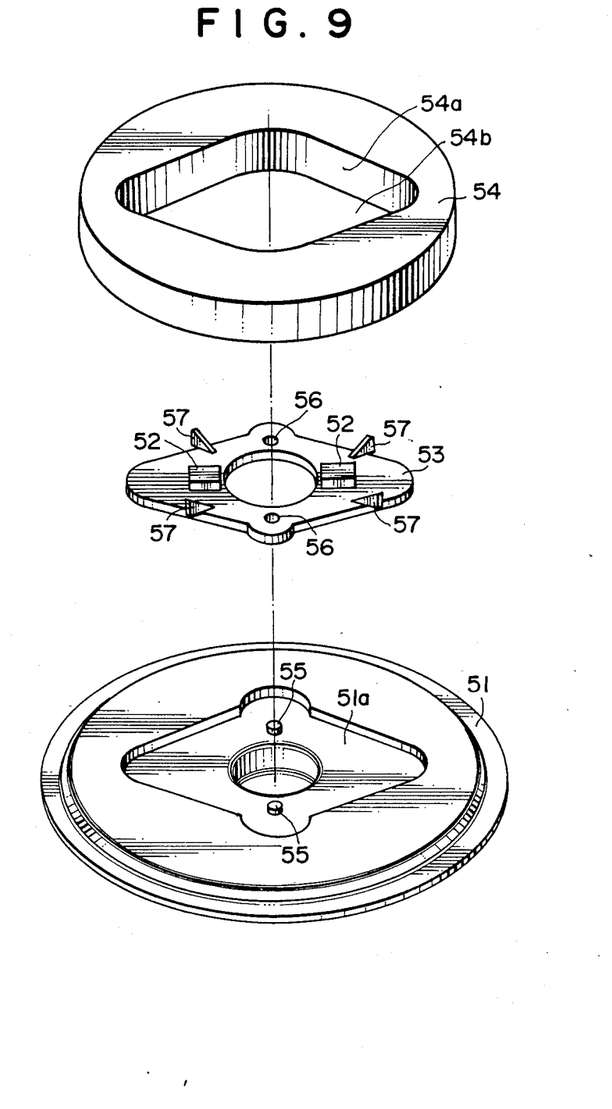
FIG. 9 is an exploded perspective view of a part of a flat motor according to a third embodiment of the present invention.

FIG. 9 illustrates a part of a flat motor according to a third embodiment of the present invention. In FIG. 9, motor housing 51, holder plate 53 having a pair of brush holders 52 and magnet 54 are shown. In this embodiment, holder plate 53 is shaped in a lozenge, a recessed portion 51a having a shape of a lozenge corresponding to the shape of the holder plate is formed on motor housing 51, and the center hole 54b of magnet 54 is also shaped in a lozenge. Columnar projections 55 are provided in the recessed portion 51a of motor housing 51 as a first engaging mechanism and through holes 56 engaging the columnar projections are formed in holder plate 53 as a second engaging mechanism. A triangular projection 57 is provided on each of the four sides of holder plate 53 as a third engaging mechanism and the triangular projections are formed integrally with the holder plate.

In this embodiment, holder plate 53 is positioned coaxially with motor housing 51 by the engagement of columnar projections 55 with through holes 56. Since recessed portion 51a shaped in a lozenge which follows the shape of holder plate 53 is formed on motor housing 51, columnar projections 55 and through holes 56 easily meet each other merely by the insertion of the holder plate into the recessed portion. As a result, the assembly of holder plate 53 can be made very easily. Moreover, since the center hole 54b of magnet 54 is shaped in a lozenge, the direction of the magnet can be regulated as well as the coaxis of the magnet and motor housing 51 by the engagement of projections 57 with the inside surface 54a of the magnet.

Figure 10:
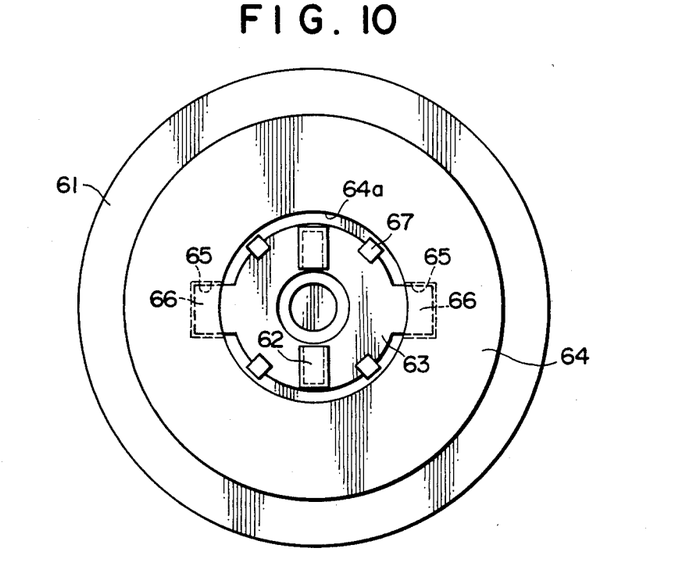
FIG. 10 is a plan view of a part of a flat motor according to a fourth embodiment of the present invention.
Figure 11:
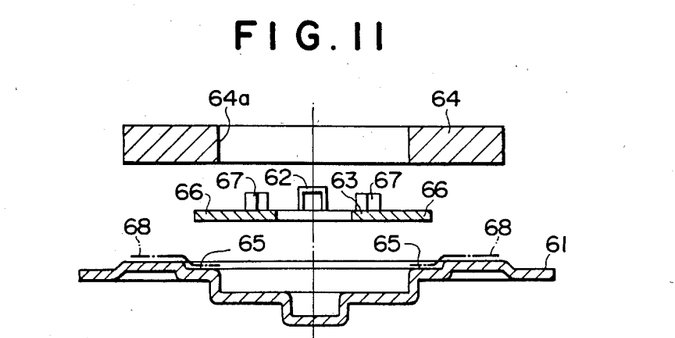
FIG. 11 is an exploded sectional view of the part of the flat motor shown in FIG. 10.

FIGS. 10 and 11 illustrate a part of a flat motor according to a fourth embodiment of the present invention. In FIGS. 10 and 11, motor housing 61, holder plate 63 having a pair of brush holders 62 and magnet 64 are shown. In this embodiment, generally rectangular recessed portions 65 are formed on the surface of motor housing 61 at positions facing each other, and similarly shaped brim portions 66, to be inserted into the corresponding recessed portions, are formed on the periphery of holder plate 63. Brim portions 66 are formed as generally rectangular, radial extensions from a main central portion of holder plate 63. Since holder plate 63 is positioned coaxially with motor housing 61 by the insertion of brim portions 66 into the corresponding recessed portions 65, the recessed portions constitute a first engaging mechanism and the brim portions constitute a second engaging mechanism.

In this embodiment, since brim portions 66 are supported between motor housing 61, having recessed portions 65, and magnet 64 bonded to the motor housing by an adhesive 68 so as to be enveloped between the motor housing and the magnet, the brim portions are strongly fixed between the motor housing and the magnet. Therefore, holder plate 63 can be sufficiently strongly fixed to motor housing 61 by bonding it to the motor housing via an adhesive without the use of screws or rivets, whereby the sufficiently high reliability and durability of the motor is assured.

Magnet 64 is positioned coaxially with holder plate 63 by the engagement of block-shaped projections 67 provided on the holder plate as a third engaging mechanism with the inside surface 64a of the magnet.

Although recessed portions 65 are formed on motor housing 61 in this embodiment, the recessed portions may be formed on magnet 64 or on both of the motor housing and the magnet. Since the brim portions are sandwiched between the motor housing and the magnet, the recess in combination with the motor housing and magnet can be considered parts of the first engaging mechanism. Moreover, brim portions 66 are bonded to recessed portions 65 via adhesive 68 in order to mainly prevent the vibration of holder plate 63. Brim portions 66 may be bonded to magnet 64 or motor housing 61 or to both of them.

Although several preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. A flat motor comprising:
   a motor housing having first engaging means, said first engaging means including projections extending from the inner surface of said motor housing, said projections disposed at predetermined positions on the inner surface of said housing;
   a ring-like shaped magnet fixed to said motor housing;
   a holder plate attached to said motor housing and provided with a pair of brush holders, and a brush held in each brush holder, said holder plate having second engaging means including holes formed in said holder plate, said holes formed at predetermined positions corresponding to the predetermined positions of said projections, said holder plate positioned coaxially with said motor housing by engagement of said holes of said second engaging means with said projections of said first engaging means;
   third engaging means for positioning said magnet coaxially with said holder plate by engagement of said third engaging means with an inside surface of said magnet; and
   an armature including a commutator inserted between the pair of brushes held in said pair of brush holders.

2. The flat motor according to claim 1, wherein said holder plate is shaped in a circle.

3. The flat motor according to claim 1, wherein said holder plate is shaped in a lozenge.

4. The flat motor according to claim 1, wherein said holder plate is shaped in a rectangle.

5. The flat motor according to claim 1, wherein said third engaging means includes second projections extending above said holder plate.

6. A flat motor comprising:
a motor housing;
a ring-like shaped magnet fixed to said motor housing;
first engaging means including a recessed portion formed on at least one of the surface of said motor housing and the surface of said magnet which face each other; and
a holder plate attached to said motor housing and provided with a pair of brush holders, a brush held in each brush holder, said holder plate having second engaging means including a brim portion formed on the periphery of said holder plate, said first and second engaging means for positioning said holder plate coaxially with said motor housing by insertion of said brim portion into said recessed portion.

7. The flat motor according to claim 6 further comprising:
a third engaging means for positioning said magnet coaxially with said holder plate by engagement of said third engaging means with an inside surface of said magnet; and
an armature including a commutator inserted between the pair of brushes held in said pair of brush holders.

8. The flat motor according to claim 7, wherein said brim portion is bonded to at least one of said motor housing and said magnet.

9. The flat motor according to claim 7, wherein said brim portion is formed as at least two separate radial extensions from a main central portion of said holder plate.

10. The flat motor according to claim 9, wherein said radial extensions are generally rectangular.

11. The flat motor according to claim 7, wherein said third engaging means includes projections extending from said holder plate.

12. A flat motor comprising:
a motor housing having first engaging means;
a ring-like shaped magnet fixed to said motor housing;
a holder plate attached to said motor housing and provided with a pair of brush holders, and a brush held in each brush holder, said holder plate having second engaging means for positioning said holder plate coaxially with said motor housing by engagement of said second engaging means with said first engaging means;
an armature including a commutator inserted between the pair of brushes held in said pair of brush holders, each of said brushes inserted into one said brush holder from an entrance which is located at an inner side of each said brush holder in a radial direction with respect to the motor;
urging means disposed in said brush holders for urging the inserted brushes inwardly in the radial direction so as to come in to contact with said commutator; and
a hook-shaped piece provided on said holder plate at a position near each said entrance of each said brush holder.

13. The flat motor according to claim 12 further comprising third engaging means for positioning said magnet coaxially with said holder plate by engagement of said third engaging means with an inside surface of said magnet.

14. The flat motor according to claim 13 wherein said hook-shaped pieces engage wires temporarily provided for assembly of the motor so as to position extending portions of the wires at said entrances of said brush holders, the extending portions of the wires stopping the motion of said brushes urged in the radial direction by engagement of the extending portions of the wires with the brushes.

15. The flat motor according to claim 13, wherein said hook-shaped piece is provided at one side of said each brush holder.

16. The flat motor according to claim 13, wherein said hook-shaped piece is provided at both sides of said each brush holder.

* * * * *